United States Patent [19]

Gulati

[11] 4,042,738
[45] Aug. 16, 1977

[54] HONEYCOMB STRUCTURE WITH HIGH THERMAL SHOCK RESISTANCE

[75] Inventor: Suresh T. Gulati, Elmira, N.Y.

[73] Assignee: Corning Glass Works, Corning, N.Y.

[21] Appl. No.: 599,624

[22] Filed: July 28, 1975

[51] Int. Cl.$^2$ .............................................. B32B 3/12
[52] U.S. Cl. ............................... 428/116; 252/477 R; 428/188
[58] Field of Search ..................... 23/288 FC; 52/615, 618; 156/197; 428/72, 73, 116–120, 188; 252/477 R

[56] References Cited

U.S. PATENT DOCUMENTS

| | | | |
|---|---|---|---|
| 3,502,596 | 3/1970 | Sowards | 428/116 X |
| 3,790,654 | 2/1974 | Bagley | 264/177 |
| 3,826,603 | 7/1974 | Wiley | 425/461 |
| 3,846,197 | 11/1974 | Wiley | 156/15 X |
| 3,885,977 | 5/1975 | Lachman et al. | 106/62 |
| 3,899,326 | 8/1975 | Frost et al. | 264/57 X |

*Primary Examiner*—George F. Lesmes
*Assistant Examiner*—Henry F. Epstein
*Attorney, Agent, or Firm*—Burton R. Turner; Clarence R. Patty, Jr.

[57] ABSTRACT

A honeycomb structure is formed with a plurality of interconnected partitions which are unidirectionally discontinuous in a plane transverse to the longitudinal axis of the structure and which form a plurality of diamond-shaped cellular open portions extending longitudinally through the structure, to thereby provide a honeycomb structure with a relatively low bulk modulus and substantially isotropic moduli in transverse planes perpendicular to the longitudinal axis of the honeycomb structure, thus providing improved thermal shock resistance.

8 Claims, 2 Drawing Figures

HONEYCOMB STRUCTURE WITH HIGH THERMAL SHOCK RESISTANCE

BACKGROUND OF THE INVENTION

This invention relates to the structural configuration of the cellular portions of a honeycomb structure, and more particularly to an improved cellular structure providing a low bulk modulus and high thermal shock resistance.

Cellular or honeycomb structures made of a ceramic material have application as substrates in catalytic converters for the emissions from internal combustion engines. Due to the extreme temperature variations which such honeycomb structures are subjected to, it is imperative that the structures be provided with the highest thermal shock resistance possible. Naturally, it is desirable to utilize a material having a low coefficient of expansion, and to strengthen the web portions of the structure as much as possible to maintain their integrity. However, in view of the fact that the thickness of such web portions varies between about 0.002 inches and 0.050 inches so as to provide open frontal areas of about 75% or greater, and further in view of the fact that the materials utilized are necessarily of a porous nature so as to increase surface area and facilitate the adhesion of a catalyst thereon, the amount of strengthening and the number of acceptable compositions are severly limited. However, by selecting proper web geometry (i.e. the geometry of the partition members), it is possible to increase the thermal shock resistance by selecting a geometry which will provide the lowest possible bulk modulus and elastic isotropy in transverse planes.

Accordingly, the present invention has helped to overcome the problem of thermal shock in honeycomb structures utilized as catalytic supports in emission control devices, by providing optimum geometry which has low bulk modulus and planar isotropy providing high thermal shock resistance.

SUMMARY OF THE INVENTION

In its very simplest form, the present invention is directed to a specific cell geometry in a honeycomb structure formed by specific orientations of web portions or partition members longitudinally extending through the honeycomb structure, which form the open cellular portions extending therethrough. The particular cell geometry is formed so as to provide for substantially isotropic deformation in transverse planes perpendicular to the longitudinal axis of the honeycomb structure and to omnidirectionally absorb, within such planes, thermally induced forces so as to prevent structural failure due to thermal shock.

A very rigid structure, being mechanically stiff, is not readily deformable, and accordingly has a high structural modulus, and consequently will have a low thermal shock resistance. Thus, the particular geometry necessary to provide a low structural modulus must in fact be easily deformable in all directions within the transverse plane of the partitions or webbing so as to omnidirectionally absorb thermal forces exerted within such plane. Accordingly, webs or partitions which continuously extend unidirectionally across such plane must be avoided, since such continuous webs impart structural rigidity which is detrimental when considering thermal shock resistance. Accordingly, the web portions of the present invention, when viewed transversely to the longitudinal axis of the honeycomb structure, are discontinuous in any one direction and do not unidirectionally extend across the transverse plane. In fact, the web portions of the present invention are continuous in any direction within such a plane for a maximum of three web intersection points, or stated another way, for maximum of two consecutive individual wall portions.

Except for those individual walls adjacent to the bounding wall portion of the honeycomb structure, each individual wall portion terminates at one end at an intersection of six wall portions, and at its opposite end at an intersection of three wall portions. The intersections of six wall portions are also intersected by the major diagonals of the cellular openings extending radially outward from such intersections, whereas the intersections of three wall portions are also intersected by the minor diagonals of the cellular openings bounding such intersections. The major diagonals about each six-partition intersection are each spaced apart by 60° whereas the minor diagonals intersecting each three-partitioned intersection are spaced apart by 120°.

It has thus been an object of the present invention to provide a novel cell geometry for honeycomb structures which provides improved thermal shock resistance.

BRIEF DESCRIPTION OF THE PREFERRED EMBODIMENTS

Figure 1:
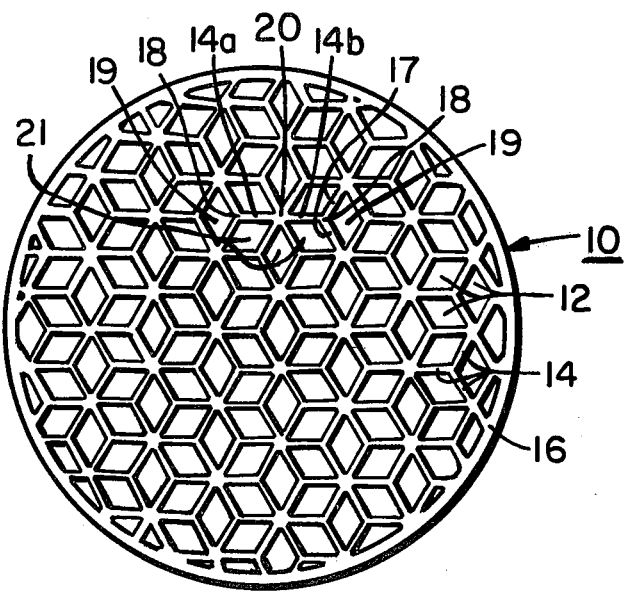
FIG. 1 is a plan view of a honeycomb structure taken perpendicular to a longitudinal axis of said structure showing the cell geometry and wall portions forming the same.

Referring now to the drawings, and particularly FIG. 1, a honeycomb structure 10 is shown comprising a plurality of cells or passage 12 formed by partitions or web portions 14 within an outer bounding wall or skin portion 16. The description of the cell portions and partitions forming the same is given as they would be viewed in a plane extending normal to the longitudinal axis of the honeycomb structure 10, such as shown in FIG. 1. Although the honeycomb structure 10 is shown as a cylindrical body having a circular outer bounding wall 16, the outer bounding wall may take any desired curvilinear or geometric configuration, such as elliptical, oval, rectangular, triangular, or the like. In all cases, however, the cells or passageways 12 and the partitions or web portions 14 extend longitudinally along and through the longitudinal extent of the structure 10.

Figure 2:
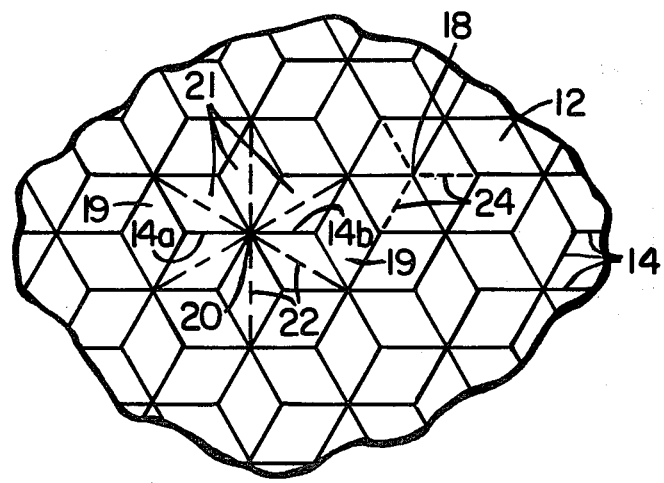
FIG. 2 is a slightly enlarged fragmental schematic view of the partitions forming the cell structure of FIG. 1.

As shown in FIGS. 1 and 2, the honeycomb structure 10 is formed of a plurality of diamond-shaped cells positioned relative to one another such that the partitions or web portions forming the walls of the cells do not extend unidirectionally continuously across the transverese extent of the honeycomb structure, but rather are continuous thereacross only in a multidirectional tortuous path. In fact, a maximum of only two consecutive individual wall portions of partitions 14, such as 14a and 14b , are continuously unidirectional within a plane transverse to the longitudinal axis of the structure. The ends of such combined consecutive undirectional wall portions terminate in three-partition intersections 18 having additional consecutive wall portions extending angularly therefrom in equal obtuse angles. Thus, a rigid section extending in one direction, which might be identified as 14a and 14b, intersects with angularly disposed leg portions which provide for deformable diamond-shaped cells 19 at each end thereof. Another rigid section extends on the opposite side of each deformable cell (except when adjacent to the bounding wall), and such rigid sections are separated by a distance equivalent to the minor diagonal of the diamond-shaped cell therebetween. Thus, each rigid section extending in any direction throughout the transverse plane has a maximum of only two consecutive wall portions which terminate at their opposite ends in angular leg portions 17 forming deformable diamond-shaped cells which impart flexibility to the structure and provide for a low bulk modulus and accordingly result in high thermal shock resistance. The angular legs at each end of each rigid section provide built-in springiness or flexibility within the structure so that thermally induced forces can be absorbed through controlled deformation within the cellular structure without experiencing structural failure through cracking or spalling.

Each rigid section, such as 14a, 14b, intersects intermediate its extent with two other such rigid sections in a six-partition intersection 20, which has six diamond-shaped cells 21 extending radially outward from such intersection between the intersecting partitions. As noted particularly in FIG. 2, such radially extending cells 21 have major diagonals 22 which intersect at said six-partition intersection 20 at an angle of 60° to one another. In view of the cell arrangement, it will be apparent that alternate intersections of said interconnected partitions are surrounded by six diamond-shaped cells radially extending from such intersection with the other intersections between the alternate intersections being surrounded by three diamond-shaped cells. As further shown in FIG. 2, the cells bounding the three-partition intersections 18 have minor diagonals 24 which intersect at said three-partition intersection at an angle of 120° to one another. It will be further noted in both FIGS. 1 and 2 that each cell 12 is in fact a deformable cell 19 at the end of a rigid section, and simultaneously is a radially extending cell 21 from a six-partition intersection 20. The interrelation between the various cells and orientations thereof provide for an isotropic structure within planes perpendicular to the longitudinal axis of the honeycomb structure.

The thermal shock resistance of a structure is directly proportional to the strength of the structure and inversely proportional to its bulk modulus and coefficient of expansion. That is, the requirements for high thermal shock resistance, which is the property which describes the ability of a structure to withstand severe changes in temperature without structural failures such as cracking or spalling, are low bulk modulus, low thermal expansion and high strength. Of these criteria, only the bulk modulus is greatly influenced by the cell geometry of the honeycomb structure. By changing the composition of the material utilized in forming the honeycomb structure, it is possible to modify the coefficient of expansion. Further, the structure may be strengthened by manufacturing techniques; however, composition changes are limited by other considerations such as compatibility with the catalytic coating and material strength, and the strength of the structure is limited by the need for thin porous walls and large open frontal area. Thus, it is the bulk modulus which may be optimized by the selection of a particular cell geometry. That is, in order to minimize thermally induced stresses within the structure, the bulk moduli should be kept as low as possible because the strains are fixed by temperature gradient, and the stress is the product of the bulk modulus and strain.

To illustrate the improved lower structural modulus obtained with the geometry of the present invention over that of squares and triangles, it has been found that for honeycomb structures having equivalent open frontal areas, the diamond-shape geometry of the present invention has a structural modulus of up to about 10 times lower than the structural modulus provided by square or triangular cells. Whereas the structural modulus for the diamond-shaped cellular structure of the present invention is virtually isotropic, the structural moduli for square and triangular shaped cell geometries are anisotropic due to continuous webs extending transversely across planes perpendicular to the axis of the honeycomb structure. That is, a maximum value of structural modulus will occur in the plane of the substrate in the direction of the continuous webs. Accordingly, a comparison of the maximum structural modulus for square-shaped cells, triangular-shaped cells and diamond-shaped cells produces a meaningful relationship in view of the fact that it is the maximum structural modulus which is the critical modulus, since the structure will fail in such direction under thermal shock.

For square-shaped cells, $\overline{E} = (E/L/t)$; for triangular-shaped cells $$\overline{E} = \frac{E}{0.77(L/t)} ;$$

and for diamond-shaped cells of the present invention $$\overline{E} = \frac{E}{0.216(L/t)^3 + 1.15(L/t)}$$

wherein $\overline{E}$ is the structural modulus, $E$ is the elastic modulus of the parent material, $L$ is the length of any individual wall portion measured from middle of web to middle of web at each end thereof, and $t$ is the thickness of the web portion. As a practical illustration, a wall portion having a length of 0.070 inches and a thickness of 0.010 inches results in $(L/t) = 7$ and accordingly for square cells $\overline{E} = 0.14E$; for triangular cells $\overline{E} = 0.18E$ and for the novel diamond cells of the present invention $\overline{E} = 0.012E$. Accordingly, in such illustration it can be seen that the structural modulus is substantially less, by a factor of about 10 from that obtained with square or triangular cellular shapes. The bulk modulus previously referred to is of interest due to the two-dimensional nature of inplane stresses and is equal to $$\frac{\overline{E}}{(1 - \nu)}$$

wherein $\overline{E}$ is the structural modulus and $\nu$ is the Poisson's ratio, which for purposes of analysis has empirically been given a value of 0.2.

The honeycomb structure of the present invention may be formed of any suitable ceramic like material, such as disclosed in U.S. Pat. No. 3,885,977, and is preferably formed by extruding the same through a suitable die such as disclosed in U.S. Pat. Nos. 3,790,654 and 3,826,603. In fact, the die disclosed in U.S. Pat. No. 3,826,603 was devised in order to manufacture the structure of the present invention. The manufacture and processing of substrates for catalytic converters is also disclosed in U.S. Pat. No. 3,899,326, with the substance of the aforementioned patents being incorporated herein by reference. As noted particularly in the 3,826,603 patent, it is preferable to round intersections of the various web portions in order to eliminate stress concentrations.

It will be apparent that various changes and modifications may be made to the invention as described and disclosed herein without departing from the spirit and scope thereof as defined in the appended claims.

I claim:

1. A ceramic honeycomb structure having improved thermal shock resistance comprising, a plurality of interconnected partitions extending longitudinally along the longitudinal extent of said honeycomb structure within a bounding wall portion and forming a plurality of cells or passageways extending longitudinally therethrough, said cells having a diamond shape when viewed in a plane transverrse to the longitudinal extent of said honeycomb structure, and said interconnected partitions being discontinuous in any one direction within said plane such that no continuous unidirectional partition extends transversely across said honeycomb structure within such plane.

2. A honeycomb structure as defined in claim 1 wherein said interconnected partitions are comprised of individual wall portions of said cells, and a maximum of two consecutive wall portions extend in any one direction within said plane.

3. A honeycomb structure as defined in claim 1 wherein said interconnected partitions which are discontinuous in any one direction within said plane are separated by a distance equivalent to the minor diagonal of a diamond-shaped cell positioned therebetween.

4. A honeycomb structure as defined in claim 1 wherein said interconnected partitions are comprised of the individual wall portions of said cells, and each wall portion, with the exception of those adjacent to said bounding wall portion, terminates at one end at an intersection of three wall portions, and at its opposite end at an intersection of six wall portions.

5. A ceramic honeycomb member having a bounding wall portion surrounding a plurality of interconnected longitudinally extending partitions which form a plurality of cells extending therebetween with a cellular structure when viewed in a plane perpendicular to the longitudinal axis of said partitions, said cellular structure comprising a plurality of diamond-shaped cells bounded by said interconnected partitions, said interconnected partitions forming individual wall portions of said cells, and said interconnected partitions being transversely continuous across said plane only in a multidirectional tortuous path.

6. A honeycomb member as defined in claim 5 wherein each of said individual wall portions, with the exception of those adjacent to said bounding wall portion, terminate at one end at an intersection with two additional individual wall portions, and at its opposite end at an intersection with five additional individual wall portions.

7. A honeycomb member as defined in claim 5 wherein alternate intersections of said interconnected partitions are surrounded by six diamond-shaped cells radially extending from such intersection with the other intersections between the alternate intersections being surrounded by three diamond-shaped cells.

8. A honeycomb member as defined in claim 7 wherein said radially extending diamond-shaped cells have major diagonals intersecting said alternate intersections at an angle of 60° to one another, and the three diamonds surrounding said other intersection have minor diagonals intersecting such other intersection at an angle of 120° with each other.

* * * * *